United States Patent [19]

Long, III

[11] Patent Number: 5,081,969

[45] Date of Patent: Jan. 21, 1992

[54] IGNITION COMBUSTION PRE-CHAMBER FOR INTERNAL COMBUSTION ENGINES WITH CONSTANT STOICHIOMETRIC AIR-FUEL MIXTURE AT IGNITION

[75] Inventor: Alexander Long, III, Oakton, Va.

[73] Assignee: Electromotive, Inc., Chantilly, Va.

[21] Appl. No.: 480,170

[22] Filed: Feb. 14, 1990

[51] Int. Cl.$^5$ ............................................. F02B 19/10
[52] U.S. Cl. ..................................................... 123/274
[58] Field of Search ................ 123/275, 274, 277, 278

[56]  References Cited

U.S. PATENT DOCUMENTS

| | | | |
|---|---|---|---|
| 1,162,804 | 12/1915 | Penquite . | |
| 1,359,591 | 11/1920 | Grimes . | |
| 1,522,551 | 1/1925 | Shepherd . | |
| 2,100,320 | 11/1937 | Browning | 123/169 |
| 2,436,090 | 2/1948 | Bodine, Jr. | 123/32 |
| 2,456,080 | 12/1948 | Wu Pe | 123/143 |
| 2,646,782 | 7/1953 | Fisher | 123/169 |
| 2,708,428 | 5/1955 | Fisher | 123/191 |
| 2,826,187 | 3/1958 | Meyer | 123/191 |
| 3,073,289 | 1/1963 | Candelise | 123/26 |
| 3,124,113 | 3/1964 | May et al. | 123/277 |
| 3,154,058 | 10/1964 | Warren | 123/32 |
| 3,213,839 | 10/1965 | Gitlin et al. | 123/143 |
| 3,382,850 | 5/1968 | Baudry et al. | 123/32 |
| 3,710,764 | 1/1973 | Jozlin | 123/32 |
| 3,738,331 | 6/1973 | Braun et al. | 123/8.09 |
| 3,738,339 | 6/1973 | Huntzinger et al. | 123/117 |
| 3,786,789 | 1/1974 | Barr et al. | 123/478 |
| 3,905,343 | 9/1975 | Ryan | 129/75 B |
| 3,908,625 | 9/1975 | Romy | 123/32 SP |
| 3,919,985 | 11/1975 | Yagi et al. | 123/32 SP |
| 3,926,158 | 12/1975 | Dolza, Sr. | 123/75 B |
| 3,930,471 | 1/1976 | Leonard et al. | 123/32 SP |
| 3,990,412 | 11/1976 | Zechnall et al. | 123/478 |
| 4,006,725 | 2/1977 | Baczek et al. | 123/32 SJ |
| 4,014,301 | 3/1977 | Happel | 123/32 SP |
| 4,034,720 | 7/1977 | Noguchi et al. | 123/32 SP |
| 4,041,922 | 8/1977 | Abe et al. | 123/191 S |
| 4,060,058 | 11/1977 | Hideg et al. | 123/8.09 |
| 4,061,114 | 12/1977 | Christopher | 123/32 SJ |
| 4,071,001 | 1/1978 | Goto | 123/75 B |
| 4,071,013 | 1/1978 | Thuren et al. | 123/277 |
| 4,075,996 | 2/1978 | Hisserich | 123/143 A |
| 4,077,366 | 3/1978 | Hideg et al. | 123/32 SP |
| 4,084,551 | 4/1978 | Noguchi et al. | 123/32 SP |
| 4,085,713 | 4/1978 | Noguchi et al. | 123/75 B |
| 4,108,136 | 8/1978 | Hideg et al. | 123/209 |
| 4,127,095 | 11/1978 | Noguchi et al. | 123/30 D |
| 4,167,923 | 9/1979 | Iwase et al. | 123/117 D |
| 4,175,506 | 11/1979 | Sakamoto et al. | 123/117 D |

(List continued on next page.)

FOREIGN PATENT DOCUMENTS 52-47142  4/1977  Japan .................................. 123/274

OTHER PUBLICATIONS

TEC Calibration Software User's Manual, pp. C-1 to C-31, published and copyrighted by Electromotive, Inc., 1989.

Primary Examiner—Andrew M. Dolinar
Attorney, Agent, or Firm—Nixon & Vanderhye

[57]  ABSTRACT

An ignition combustion pre-chamber for igniting an air-fuel mixture in an internal combustion engine which operates in conjunction with an engine management system to maintain an ideal stoichiometric air-fuel ratio in the pre-chamber throughout the complete operating range of the engine. A one-way check valve admits a separate air-fuel mixture into the pre-chamber which, after mixing with the portion of the air-fuel mixture of the main combustion chamber which necessarily enters the pre-chamber during the compression stroke of the engine, results in an ideal stoichiometric mixture receptive to quick ignition and faster flame front propagation throughout the main combustion chamber. In a second embodiment, the pre-chamber is separated from the main combustion chamber by a second one-way check valve which prevents mixing of the separate air-fuel mixtures during the compression stroke, allowing a constant stoichiometric air-fuel ratio to be introduced into the pre-chamber and ignited. Alternate gaseous fuels can also be used with the pre-chamber.

2 Claims, 5 Drawing Sheets

| | | | |
|---|---|---|---|
| 4,182,281 | 1/1980 | Heintzelman | 123/30 D |
| 4,208,992 | 6/1980 | Polo | 123/117 R |
| 4,218,992 | 8/1980 | Latsch et al. | 123/263 |
| 4,218,993 | 8/1980 | Blackburn | 123/256 |
| 4,239,023 | 12/1980 | Simko | 123/275 |
| 4,248,189 | 2/1981 | Barber et al. | 123/169 PA |
| 4,249,493 | 2/1981 | Honig et al. | 123/416 |
| 4,256,071 | 3/1981 | Casull | 123/266 |
| 4,259,932 | 4/1981 | Hideg et al. | 123/209 |
| 4,292,943 | 10/1981 | Kyogoku et al. | 123/427 |
| 4,300,518 | 11/1981 | Petrie | 123/609 |
| 4,305,357 | 12/1981 | Scherenberg et al. | 123/254 |
| 4,332,223 | 6/1982 | Dalton | 123/253 |
| 4,433,660 | 2/1984 | Blaser | 123/266 |
| 4,494,509 | 1/1985 | Long | 123/416 |
| 4,509,476 | 4/1985 | Breuser et al. | 123/266 |
| 4,576,134 | 3/1986 | Yamato et al. | 123/274 |
| 4,638,777 | 1/1987 | Fanner et al. | 123/277 |
| 4,646,695 | 3/1987 | Blackburn | 123/256 |
| 4,649,881 | 3/1987 | Long | 123/418 |
| 4,696,269 | 9/1987 | Blackburn | 123/256 |
| 4,736,718 | 4/1988 | Linder | 123/267 |
| 4,787,354 | 11/1988 | Wilens et al. | 123/414 |

IGNITION COMBUSTION PRE-CHAMBER FOR INTERNAL COMBUSTION ENGINES WITH CONSTANT STOICHIOMETRIC AIR-FUEL MIXTURE AT IGNITION

FIELD OF THE INVENTION

The present invention relates to ignition combustion pre-chambers for internal combustion engines, and in particular, to pre-chambers which burn an air-fuel mixture different from the main combustion chamber air-fuel mixture.

BACKGROUND AND SUMMARY OF THE INVENTION

The dual problems of environmental air pollution and poor automotive fuel efficiency have forced the U.S. Government to legislate maximum limits on the amounts of CO, HC and NOx a vehicle can emit into the atmosphere, and to set long range average fleet MPG requirements for each auto manufacturer.

The U.S. Government is presently seeking to further restrict tail pipe emissions while further increasing fuel economy. It is also proposing alternative fuels for automobiles, such as alcohol, LPG and gas-alcohol mixtures to reduce emissions and decrease U.S. dependency on foreign oil. State and local governments are passing even stricter emission laws and are even planning to restrict the use of internal combustion engines in certain localities.

Auto manufacturers have attempted to answer government proposed emissions controls requirements in the past by utilizing a three-way catalytic converter in automotive exhaust systems to burn the pollutants emitted by the engine and thereby meet governmental emission standards. Emissions are legally monitored by the EPA, which tests all new cars for emissions and MPG, and also monitors the exhaust emissions of cars on the road.

The catalytic converter burns the pollutants efficiently only when the engine is running at or near an air-fuel ratio of 14.7:1, the stoichiometric or chemically correct ratio. When this ratio of air and fuel is provided in a mixture and the mixture is ignited, all of the carbon and hydrogen completely burns, yielding only carbon dioxide and water in the exhaust (if combustion were perfect).

However, experience has shown that 14.7 to 1 is functionally ideal only in steady-state operation (such as in turnpike cruising) which involves only minute variations in throttle valve angle, manifold pressure and engine speed. A leaner mixture with a ratio of 16.0:1 or greater has been found adequate for part-throttle, light-load operation, but a richer mixture approaching 12:1 is required for full-throttle acceleration. A ratio of 10:1 or 11:1 is preferable for a hot engine at idle, but for cold starts the mixture must be as rich as 3:1 or 4:1, because of the poor atomization of fuel in cold air. Thus, it is generally impossible to run an automobile engine with the same air-to-fuel ratio for all engine speeds and operating parameters. Designers and manufacturers of air and fuel delivery systems (e.g., carburetors and fuel injection systems) must generally make a number of compromises to provide acceptable engine operation over the entire range of engine operating conditions.

The problem of controlling engine air-fuel mixture over a range of operating conditions is exacerbated by the problem of incomplete combustion.

Normal combustion occurs when the mixture in the combustion chamber is ignited by a spark plug firing at a preset point in time near the end of the compression stroke in a four-stroke engine, starting a wave of flame spreading out from the spark plug. This flame front continues to move through the combustion chamber until it reaches the other side. The compressed mixture burns smoothly and evenly. However, flame-front speed varies in speed—from twenty feet per second to over 150 feet per second, depending mainly on air-fuel ratio, compression ratio, turbulence and combustion chamber design. Flame travel is quite slow when the mixture is very rich, and is also slow when the mixture is very lean.

Thus, the ratio by weight of air to fuel in the air-fuel mixture determines the degree to which the mixture can burn and combustion can proceed. A lean mixture contains excess air and, as the mixture becomes leaner, it takes longer to complete the burn of the mixture. On the other hand, a rich mixture does not contain enough air to burn the mixture completely. At very rich conditions, the mixture fails to burn sufficiently to produce adequate power, leaving a large amount of the fuel unburned in the exhaust of the engine.

But even when supplied with a fuel mixture at or near a stoichiometric ratio, engine operating parameters may not allow time for complete combustion. Conventional wisdom in the art is that more or less complete combustion is obtained so long as the mixture for combustion is within a range near stoichiometry (e.g., within the range of about 5½ or 6 percent by weight of the ideal 14.7:1 stoichiometric ratio for gasoline). However, even though such range of mixtures will burn more or less completely given enough time, mixtures not exactly at the ideal stoichiometric ratio may nevertheless burn too slowly to burn completely under some engine operating conditions. Adjustment of ignition timing with engine rpm and control of other factors can reduce but not entirely eliminate this incomplete burning.

Consequently, even a charge that is theoretically in or near perfect balance will normally leave some unburned fuel in the combustion chamber in the form of raw hydrocarbons and carbon monoxide. These are expelled in the exhaust, and on most post-1975 cars are treated by the catalytic converter that breaks them down chemically into harmless constituents before letting them escape into the atmosphere.

Near the lean limit of engine operation, hydrocarbon and carbon monoxide emissions are at their minimum. Nitrous oxide emissions are highest at the stoichiometric ratio, and fall off toward both the rich and lean mixture extremes. And, of course, fuel economy is increased if the engine is oxide) is perhaps much more harmful to the environment than either HC or CO—and the way of the future may therefore be to run engines with much leaner mixtures so as to reduce NOx emissions and increase fuel economy.

Unfortunately, significant problems arise when one attempts to run a conventional internal combustion engine with a very lean mixture, since the lean mixture generally burns too slowly to fully combust. Although it is becoming increasingly desirable to operate an engine as lean as possible to increase fuel efficiency without exceeding legal emission levels, there is a risk of early "flameout" (i.e., the failure of the mixture in the combustion chamber to burn) with overly-lean mixtures, i.e., air-fuel ratios greater than 16:1. This early "flameout" also increases hydrocarbon and carbon monoxide emissions to unacceptable levels. Leaning out the mixture even more can lead to a situation in which ignition cannot occur at all, causing missed combustion events and stalling.

One approach used in the past to improve the performance of lean-burn automotive engines is to use a so-called "pre-chamber".

An exemplary pre-chamber comprises a smaller secondary combustion chamber, usually housing the spark plug, which communicates with the main combustion chamber. Pre-chambers in internal combustion engines are well known for the purpose of initially spark-igniting a relatively rich air-fuel mixture within the pre-chamber. The ignited mixture then "torches out" to more rapidly ignite a relatively leaner mixture in the main combustion chamber. The flame front emanating from the pre-chamber has a large surface area and therefore very efficiently and rapidly ignites the lean mixture within the main combustion chamber.

Such pre-chamber arrangements have been used in the past in an attempt to increase fuel efficiency. It is know to retro-fit a pre-chamber to an existing engine design by screwing it into the existing spark plug hole of each cylinder, and pre-chambers machined or otherwise provided integral with the engine cylinder head or other components are also known.

As mentioned above, one operational feature associated with pre-chamber operation is that the energy released in the "torch" emanating from the pre-chamber combusts the main chamber air-fuel mixture much faster than the mixture would ignite without the pre-chamber. Conventional ignition systems utilized on most automotive engines apply 70 to 120 millijoules of electric energy to each spark plug (where the energy has a high voltage component capable of ionizing the plug gap to create an electrical discharge—the spark). The kernel of fuel burn that results grows so that in about 2.0 milliseconds the fuel-air mixture within the combustion chamber completely combusts. This time value required for complete combustion is constant for each particular engine throughout the operating speed range. As the engine speed increases, additional ignition timing advance must be provided so that at the end of 2 milliseconds, preferably at: about 9 degrees ATDC (after top dead center), the burn is complete.

Prechambers provide a "torch" ignition which burns much faster (300 ft./sec. as opposed to a 50 ft./sec. flame front velocity for spark-ignited engines). Pre-chambers therefore require less advance timing than typically needed must be set to complete the burn at 9 degrees ATDC. However, the torch burn rate changes as the main combustion mixture is made leaner, and greater ignition timing advance should be added to achieve maximum efficiency from the engine with reduced emissions. Because of the small ignition timing advance angles (e.g., 5 to 7.5 degrees) that are involved, the accuracy of timing is generally much more critical than in engines without pre-chambers.

Even though the use of pre-chambers to achieve more reliable, rapid and efficient combusion is known, it appears that no one in the past has achieved successful variable, accurate control of pre-chamber mixture to optimize pre-chamber and main chamber combustion over most or all conditions of engine operation.

The combustion of the air-fuel ratio in the pre-chamber is limited in the same way the mixture in the main chamber is limited. The pre-chamber works best when the mixture within it has a highly combustible 14.7:1 ratio. 16:1 (lean) and 13:1 (rich) air-fuel mixtures in the pre-chamber are practical limits of the range of pre-chamber mixture ratios, since the slower combustion speeds at those limits affect the ability of the pre-chamber to cause burning of the combustion chamber mixture. Missed burns can occur above or below these values. It is therefore generally desirable to control the pre-chamber mixture to always reside within these limits at or near stoichiometry. Such accurate control of pre-chamber mixture ratio typically requires an independent fueling capability for the pre-chamber. Techniques for separately fueling pre-chambers are generally known. Some exemplary prior art attempts to provide this function are discussed briefly below.

One exemplary prior art pre-chamber system has been disclosed in U.S. Pat. No. 3,919,985 to Yagi et al, which shows an internal combustion engine having a pre-chamber built into the engine head. The pre-chamber has a separate fueling capability that inserts a separate fuel-air mixture into the pre-chamber with a separate cam-operated valve. The pre-chamber mixture is ignited with a spark plug in the usual way.

U.S. Pat. Nos. 3,908,625 to Romy, 4,006,725, to Baczek et al, 4,218,993 to Blackburn and 4,248,189 to Barber et al, also all describe means to fuel a pre-chamber separately from the main combustion chamber.

U.S. Pat. No. 4,239,023 to Simko describes a means to use high pressure direct injection into both a pre-chamber and the main combustion chamber. This injection takes place during the compression stroke of the engine and, therefore, must utilize a high pressure injector.

U.S. Pat. No. 4,014,301 to Happel and assigned to Daimler-Benz Aktiengesellschaft, describes a dual fueling engine control whereby the pre-chamber is fueled separately from the main combustion chamber of the engine. A fuel injector is used to add fuel directly to the pre-chamber (which is built into the engine). The quantity of fuel so delivered is made to increase at idle speeds and to decrease at higher loads on the engine. The means shown to vary the pre-chamber fuel supply uses a mechanical arrangement on the engine distributor that varies the injector on-time as a function of RPM and engine load (vacuum). The fuel injector in the engine must be able to withstand the intense heat generated in the cylinder head and is costly to manufacture.

Other devices (shown, for example, in U.S. Pat. Nos. 4,071,001 to Goto and 4,085,713 to Noguchi et al) have made use of pre-chambers that catch a rich part of the intake air-fuel mixture in a trap-type of chamber.

Unfortunately, some significant problems arise in so controlling the prechamber mixture air-to-fuel ratio. Even the prior art techniques providing separate fueling of the pre-chamber fail to overcome these problems.

A pre-chamber is typically in direct fluid communication with the main chamber via at least one port for direct fluid transfer. Thus, as the piston moves upward during the compression stroke and compresses the gases (main chamber air-fuel mixture) in the cylinder, a portion of the compressed gases typically flows into the pre-chamber. This effect causes more than a slight dilution of the pre-chamber mixture, however. Most present-day automotive engines have compression ratios ranging from 8.5:1 to 12:1. Thus, an engine with a 10:1 compression ratio will fill the pre-chamber with approximately 90%, by volume, of the mixture in the engine cylinder, and only 10% by volume of the pre-chamber will contain the original mixture which was introduced into the pre-chamber before compression started!

None of the prior art teachings mentioned above teach or suggest a way to change or compensate the quantity of fuel in the pre-chamber mixture as the main chamber mixture is varied. As a result, the engine fails to respond adequately under some operating conditions even though the pre-chamber is fueled separately—and even though such separate fueling technique may be adjusted (as in the Daimler-Benz system) in response to change in engine operating parameters. The prior art pre-chamber devices all fail to keep the mixture in the pre-chamber at or near the ideal stoichiometric value as the main chamber mixture varies. This is a serious drawback since, as discussed above, the main chamber air-fuel mixture makes up a very large percentage of the pre-chamber volume during compression.

Of course, the main combustion chamber mixture must be variable to allow for normal acceleration during vehicle operations—even for lean burning engines. A practical automotive vehicle which is designed to have its engine run lean during steady state operation must satisfactorily cope with changes in engine speed, such as in acceleration during passing and in other everyday driving maneuvers. To accomplish this control, the main combustion chamber mixture must be made richer to prevent engine stumbling or partial stall. The pre-chamber mixture should therefore also be made leaner to prevent the compressed combined mixture of the main chamber mixture and the pre-chamber mixture from being too rich which, as discussed above, can hinder combustion.

The inability to accurately control the mixture in the pre-chamber as the mixture in the main chamber varies has prevented pre-chambers in the prior art from providing ignition enhancement over the entire engine operating range.

The present invention overcomes these problems by providing a lean-burn engine management system using pre-chamber technology that facilitates optimum combustion (and, if desired, lean-burn engine operation) over the entire operating range of the engine.

One feature of this invention is to provide a method and apparatus for promoting efficient lean-burning of an internal combustion engine utilizing electronic fuel injection and a combustion pre-chamber communicating with a main combustion chamber.

In a preferred exemplary embodiment of an internal combustion engine system in accordance with this invention, an ignition combustion pre-chamber is provided for igniting an air-fuel mixture in an internal combustion engine. The pre-chamber operates in conjunction with a microprocessor-based engine management system to maintain an optimum stoichiometric air-fuel ratio in the pre-chamber throughout the complete operating range of the engine.

In one embodiment, a one-way check valve admits a separate air-fuel mixture into the pre-chamber. After mixing with the portion of the air-fuel mixture of the main combustion chamber which necessarily enters the pre-chamber during the compression stroke of the engine, this pre-chamber mixture results in an ideal stoichiometric mixture receptive to quick ignition and faster flame front propagation throughout the main combustion chamber. If the main chamber mixture is a very lean (24:1) air-fuel ratio, by weight, the mixture introduced into the pre-chamber at the start of the compression stroke is made to be very rich, e.g., 4.5:1 air-fuel by weight, in order to provide a resulting pre-chamber mix of 14.7:1 after compression. If the mixture in the main chamber is richer than 14.7:1, a mixture leaner than 14.7:1 is introduced into the pre-chamber to provide a resulting pre-chamber mix near stoichiometry after the main chamber compression stroke.

In accordance with a further feature of the invention, the amount by which the pre-chamber mixture is enriched or leaned out (as appropriate) is calculated based on the actual (or estimated) main chamber mixture so as to provide a pre-chamber mixture at the instant of ignition (e.g., substantially after the main chamber combustion stroke has occurred) that is optimum for combusting.

In a further exemplary embodiment of the present invention, the pre-chamber is separated from the main combustion chamber by a further one-way check valve which prevents mixing of the separate air-fuel mixtures during the compression stroke. This allows a constant stoichiometric air-fuel ratio to be introduced into the pre-chamber and ignited while the main combustion chamber compression stroke is occurring. Fluid communication between the pre-chamber and the main chamber is then established to permit the pre-chamber flame front to enter the main chamber and ignite the mixture therein. Such in U.S. Pat. No. 3,710,764 to Jozlin, which fuels the pre-chamber with the main chamber mixture and then provides isolation of the pre-chamber from the main chamber during pre-chamber ignition so as to force the torch to entire the main chamber through an auxilliary port. This pre-chamber/main chamber isolation feature provided by the present is highly useful is permitting the pre-chamber to be fueled using a relatively unsophisticated air/fuel delivery system (e.g., a carburetor type system) having little or no capability to instantaneously adjust the pre-chamber mixture for different engine operating conditions and main chamber air-to-fuel ratio mixtures—while nevertheless providing nearly optimum burning of pre-chamber mixture (thus significantly enhancing main chamber combustion).

In accordance with yet another feature of the present invention, alternate gaseous fuels can be used with the pre-chamber and main combustion chamber where solenoid valves introduce a constant 100% concentration of gaseous fuel into the pre-chamber to provide the desired rich mixture for initial ignition.

Thus, one important feature of the present invention is to provide a pre-chamber fueling system which responds to changes in the main chamber fuel mixture to produce, over a range of practically all useful engine operating conditions, a combined mixture of compressed gases that is very combustible.

The present invention also provides a simple spark plug adaptor unit containing the pre-chamber that can screw into the normal spark plug hole—thus permitting the various other advantageous pre-chamber technology features of the invention to be provided in a retrofitted fashion on existing automotive engines, thereby eliminating the requirement for extensive engine redesign and engine manufacturer retooling.

Another object of the present invention is to provide a one-way check valve in the fuel inlet of the pre-chamber which allows a one-way flow of an air-fuel mixture into the pre-chamber. A spark plug hole is provided wherein a spark plug can screw into the pre-chamber for the purpose of igniting the compressed air-fuel mixture at the usual time.

Another object of this invention is to provide a pre-chamber that is disconnected (isolated) from the main chamber during compression, power and exhaust strokes by using a second one-way check valve. The fuel-mixture introduced into the pre-chamber may then be always at stoichiometry (a constant 14.7:1 air-fuel ratio) to ensure optimum burning in the pre-chamber under all engine operation conditions.

The invention also provides utilization of alternate gaseous fuels in a pre-chamber arrangement.

BRIEF DESCRIPTION OF THE DRAWINGS

These and other features and advantages of the invention may be better and more correctly understood by referring to the following detailed description of presently preferred exemplary embodiments in conjunction with the drawings, of which.

DETAILED DESCRIPTION OF PREFERRED EXEMPLARY EMBODIMENTS

Figure 1:
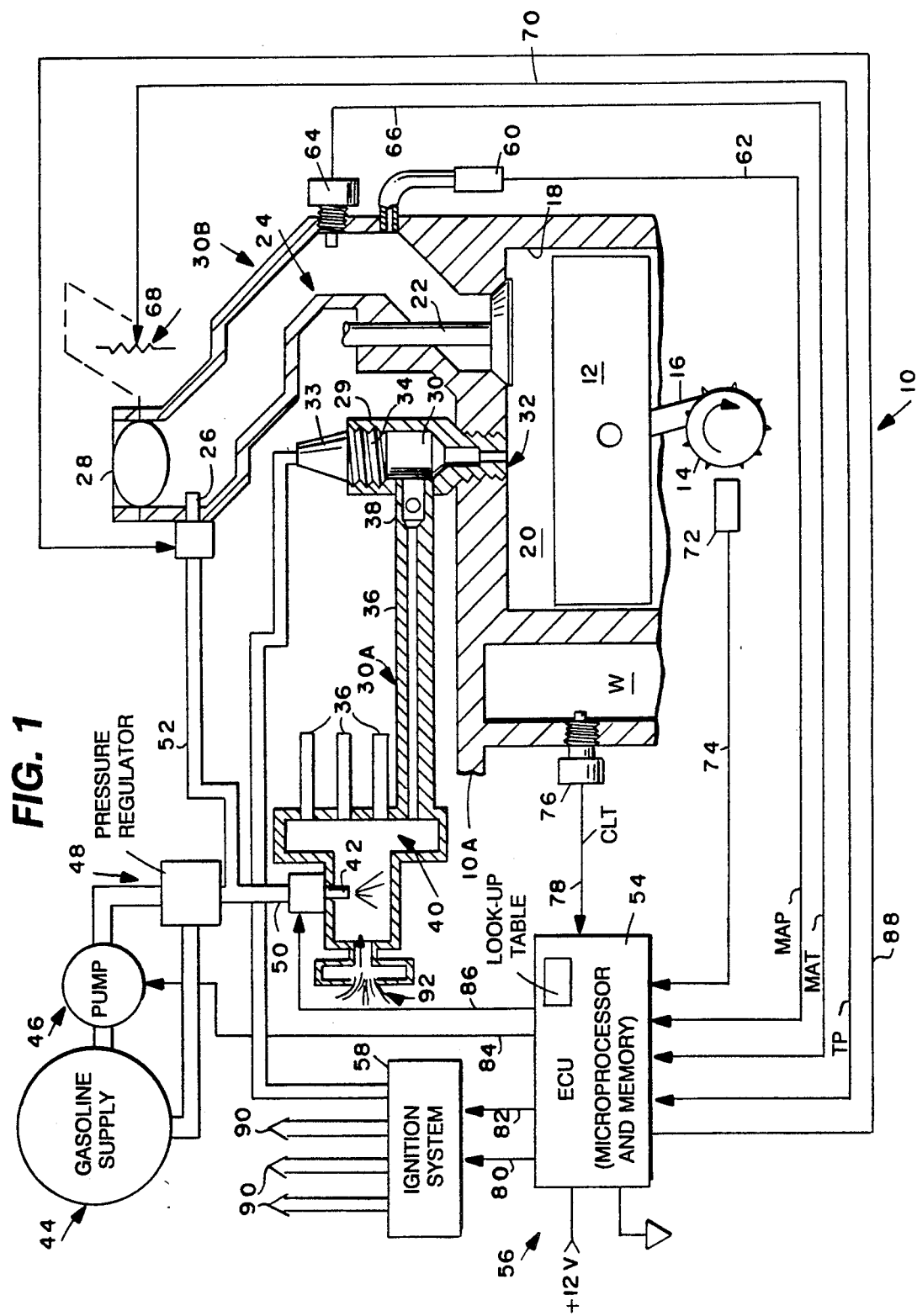
FIG. 1 is a schematic diagram of a presently preferred exemplary embodiment of an engine management control system using pre-chambers to ignite the main chamber air-fuel mixture according to the present invention.

FIG. 1 is a schematic and partial side view in cross section of a presently preferred exemplary embodiment of an internal combustion engine 10 in accordance with the present invention. Engine 10 may preferably be an Otto cycle engine having multiple combustion chambers (although only one combustion chamber is shown in FIG. 1 for ease of illustration).

Engine 10 includes a main combustion chamber 20 and a pre-chamber 30 in fluid communication with the main chamber (via a fluid communication port 34 comprising a main chamber spark plug hole in the preferred embodiment). A pre-chamber air-fuel delivery system 30A injects a mixture of air and fuel into pre-chamber 30 under control of a microprocessor-based electronic engine control unit (ECU) 54 (which may be part of an overall an electronic engine management control system 56 in the preferred embodiment). This same ECU 54 also controls a main chamber air-fuel delivery system 30B to inject a mixture of air and fuel into main chamber 20. ECU 54 in the preferred embodiment independently controls (a) the air-to-fuel ratio of the mixture applied by pre-chamber air-fuel delivery system 30A to pre-chamber 30, and (b) the air-to-fuel ratio of the mixture delivered by main chamber air-fuel delivery system 30B to main chamber 20. As will be explained shortly, ECU 54 may compensate the air-to-fuel ratio of the pre-chamber mixture in response to the air-to-fuel ratio of the main chamber mixture so as to optimally control the mixture within pre-chamber 30 over a range of engine operating parameters.

Engine 10 includes a piston 12 connected to crankshaft 14 via connecting rod 16. Piston 12 reciprocates in cylinder 18 which forms main combustion chamber 20. Intake valve 22 controls the communication of combustion chamber 20 with main chamber air-fuel delivery system 30B.

Main chamber air-fuel delivery system 30B in the preferred embodiment includes an intake tract 24 into which a main chamber air-fuel mixture is injected via fuel injector 26. A butterfly valve 28 upstream of fuel injector 26 in intake tract 24 controls the amount of air permitted into combustion chamber 20 via intake tract 24.

A pre-combustion chamber structure 29 containing pre-chamber 30 is screwed into the original spark plug hole 32 in the preferred embodiment (although it will be understood that pre-chamber 30 may also be integral with engine 10, e.g., molded and/or machined into the engine cylinder head 10A). A spark plug 33 communicates with pre-chamber 30 via pre-chamber spark plug hole 34. In the preferred exemplary embodiment, pre-combustion chamber 30 communicates in direct fluid contact with main combustion chamber 20 through original spark plug hole 32.

Figure 2:
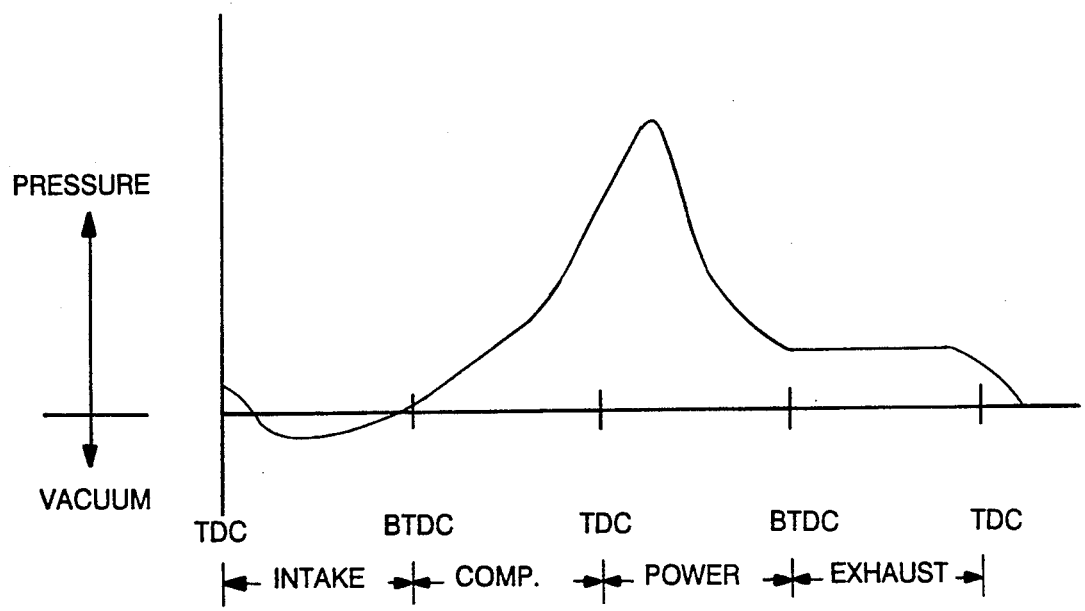
FIG. 2 is a graphical illustration of engine cylinder pressure versus crankshaft position over one complete engine cycle.

In the FIG. 1 embodiment shown, pre-chamber air-fuel delivery system 30B includes a fuel feed line 36 communicating with pre-chamber 30 via a one-way ball check valve 38. Check valve 38 permits an air-fuel flow into the pre-chamber 30 from the feed line, but does not permit air-fuel flow out of the pre-chamber into the feed line. An air-fuel mixture flows into pre-chamber 30 from pre-chamber air-fuel delivery system 30B via ball check valve 38 during an intake stroke of the internal combustion engine 10 (during which time there is a vacuum in both combustion chambers, 20, 30 as shown in FIG. 2). Ball check valve 38 prevents the expulsion of gases out of pre-chamber 30 into the pre-chamber air/fuel delivery system 30A when the pressure is high during the compression, power and exhaust strokes of the engine, as shown in FIG. 2.

In multiple-cylinder engines only one intake valve is open at any time and an air-fuel mixture via multiple feed lines 36 can be introduced into each of plural corresponding pre-chambers 30 without additional valve means from a common fuel distribution chamber 40.

The fuel is supplied from the fuel source 44 to pre-chamber fuel injector 42 via feed line 50 by means of pump 46 and pressure regulator 48. Pump 46 and pressure regulator 48 also supply fuel under pressure to both pre-chamber fuel injector 42 and main chamber fuel injector 26 via feed line 52. Within distribution manifold 40, fuel is continuously injected and mixed with air for use in pre-chamber 30.

Fuel distribution manifold 40 is fed with air at atmospheric pressure through an orifice 92, and fuel is injected at a pump pressure from pump 46. Fuel is mixed with the air as it is injected from fuel injector 42, the fuel injector communicating directly with common distribution manifold 40. The amount of time fuel injector 42 is "on" (i.e., injecting fuel) controls the quantity of fuel delivered to distribution manifold 40 and therefore to pre-chamber 30. The injector on-time pulses occur at a rate sufficiently fast to supply continuing air-fuel mixture from the distribution manifold 40.

Injector 42 is pulsed synchronously at a pulse repetition which rate can range from 60 to 220 pulses per second in the preferred embodiments, but is set at a constant rate for each particular engine. ECU 54 controls the pulse width and the time between pulses to control the quantity of fuel delivered per pulse.

Since air enters the pre-chamber air-fuel delivery system 30A through orifice 92, the amount of air entering changes only as the vacuum in pre-chamber 30 changes. It is, therefore, necessary to vary the fuel delivery to compensate for different air flows at the different vacuums that pre-chamber 30 will see over the operating range of the engine. In addition, changes in the volumetric efficiency of the pre-chamber fueling system occurring over the engine operating range must also be taken into account.

The fuel delivery must also be varied to control the air-fuel mixture to pre-chamber 30 to provide a means to enrich the pre-chamber mixture when the main combustion chamber 18 is made lean. Since pre-chamber 30 is in fluid contact with the main combustion chamber 18, whenever piston 12 is on the compression stroke the main chamber mixture will enter pre-chamber 30 and, at TDC (top dead center) will constitute a large percentage of the volume of the pre-chamber. For example, in an engine with a 10:1 compression ratio with piston 12 at TDC, 90% of the mixture within pre-chamber 30 will be from the main chamber 20 and only 10% of the mixture will be controlled by the engine pre-chamber mixture.

If the main chamber 18 mixture was originally at a $\gamma$ of, e.g., 0.5 (29:1 air-fuel ratio), the pre-chamber 30 fuel must be enriched to a $\gamma$ of 3 or richer (air-fuel ratio of 4:1) in order that the blend of the two mixtures be near 14.7:1 (stoichiometry) so that the pre-chamber mixture will ignite and torch out into main chamber 18 and ignite the mixture in the main chamber.

If, on the other hand, the main chamber mixture was at stoichiometry (14.7:1) or above, the pre-chamber mixture must be fueled at stoichiometry or leaner to provide the blend in the pre-chamber with a highly combustible mixture.

As a result, engine 10 in the preferred embodiment is fueled with dual sources: the main injection of an air-fuel mixture via injector 26 and the rest of the main chamber air-fuel delivery system 30B in a normal way to main combustion chamber 20; and a secondary injection of an air-fuel mixture to pre-chamber 30 via its dedicated fuel injector 42 and the rest of pre-chamber air-fuel delivery system 30A, as described above. ECU 54 independently controls the air-fuel ratio of the mixture provided by the main or secondary injections so as to optimize both of them, as will be explained. ECU 54 keeps account of total fuel delivered as well as the air-fuel ratio of each delivery source. ECU 54 also provides control so that for any air-fuel mixture delivered to the main chamber 20, the air-fuel mixture delivered to the pre-chamber 30 results in a highly combustible stoichiometric ratio (14.7:1) in the pre-chamber after the mixture of the main chamber is blended with the pre-chamber mixture during the compression stroke of engine 10.

The control of both the supply of fuel and resulting air-fuel ratios for both main chamber 18 and pre-chamber 30 is provided by microprocessor-based Electronic Control Unit (ECU) 54 in engine management control system 56 in the preferred embodiment. The total engine management control system 56 also includes ignition system 58. ECU 54 controls electronic fuel injection for each of injectors 26, 42 by computing and applying a pulse width that controls the time the injector is on. The injectors 26, 42 are supplied with fuel at a constant pressure in the preferred embodiment, and the "time on" of the injectors 26, 42 controls the quantity of fuel delivered to the pre-chamber 30 and main combustion chamber 20 of engine 10.

The control philosophy used may be either speed density or mass air flow (the difference is a matter of how the mass of fuel is measured). In the case of speed density, manifold pressure (vacuum) is sensed and ECU 54 computes mass air flow after correcting for air temperature, since air density is related to temperature. In the case of a mass air flow system, mass air flow may be sensed directly.

Figure 3:
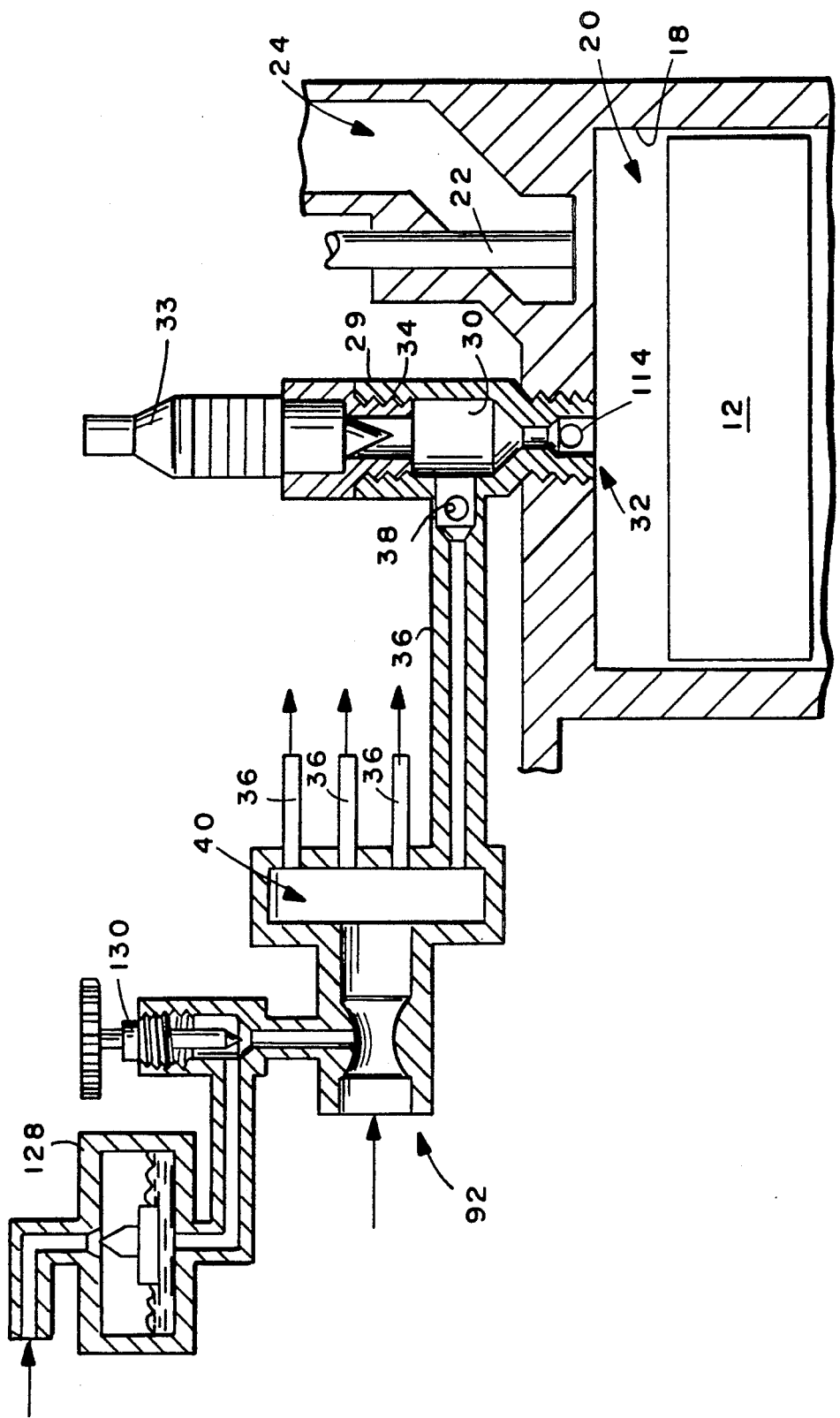
FIG. 3 is a schematic diagram of a further exemplary embodiment in accordance with the present invention utilizing a check valve to isolate the pre-chamber from the main chamber during certain portions of the engine operating cycle.

In the exemplary embodiments shown in FIGS. 1 and 3, manifold absolute pressure is sensed by MAP sensor 60 located in intake tract 24. An electrical signal representing mass air flow is generated by MAP sensor 63 and applied to ECU 54 via line 62. Similarly, manifold absolute temperature is sensed by MAT sensor 64 located in intake tract 24. MAP sensor 64 produces a further electrical signal representing manifold absolute temperature and applies this signal to ECU 54 via line 66. An electrical signal indicating throttle position is produced by TPS sensor 68 and this signal is input to ECU 54 via line 70. Magnetic sensor 72 determines crankshaft angular position, which is then input to ECU 54 via valve 74. Coolant temperature is sensed by CLT sensor 76 (preferably coupled to engine 10 water jacket W) and comprises a further input parameter to ECU 54 via line 78.

ECU 54 electronically controls the timing and duration of spark ignition provided by ignition system 58 via output lines 80, 82. ECU 54 also electronically controls the pressure of pump 46, and the timing and duration of the fuel injected by fuel injectors 26, 42 via lines 84, 86, 88, respectively.

Ignition system 58 sends high voltage energy to spark plug 32 via high tension lead 90 at a selected time during each operating cycle of engine 10. For a multicylinder engine, there will be one spark plug for each cylinder and ignition system 58 generates spark for the various cylinders in a predetermined engine firing order as is well known. The ignition system is preferably electronic with the timing controlled by ECU 54, but the present invention could utilize a conventional contact-breaker point or other ignition systems.

Engine Management in the Exemplary Embodiments

In order to provide drivability for an automotive vehicle, ECU 54 continually computes the enrichment to the overall fuel mixture. This is needed because a cold engine requires more fuel for starting and for operating at below ideal operating temperatures during warm-up. Vehicle acceleration maneuvers require more fuel and deceleration requires less fuel. The engine also pumps air at different efficiencies at various operating points and corrections are made for this via a look-up table process. The mixture is enriched at different amounts over an operating range defined by a range of manifold pressures and engine speeds (RPM) for each given engine.

The 14.7:1 air-fuel ratio auto engines prefer under steady-state conditions to ignite and burn is, as previously stated, the stoichiometric mixture with lambda $(\lambda) = 1$. When the mixture is made richer, the control system computes values of $\lambda$ less than 1.0 (e.g., at $\lambda = 0.9$ the air-fuel ratio is 13.2:1). As the mixture becomes lean, $\lambda$ becomes greater than 1.0 (e.g., at $\lambda = 1.1$ the air-fuel ratio is 16.2:1).

Mixture ratios are also described by an equivalence ratio, which is symbolized by the Greek letter lambda $(\lambda)$. $\lambda$ can be expressed as the ratio the actual amount of air delivered to the theoretical (stoichiometric) air requirement. With $\lambda$ equal to 1.0, these two quantities are identical, and the engine receives a stoichiometric air-fuel mixture. With $\lambda$ values less than 1.0, there is an air shortage and a resulting rich mixture. With $\lambda$ values greater than 1.0, there is an air surplus and a resulting lean mixture.

Each engine has its own lean limit of operation, and that is why there is no fixed general number for the truly "best" economy figure. It has been determined that maximum efficiency for any real engine in use is reached with at least half the fuel required for the stoichiometric ratio--that is, with a $\lambda$ value below 2.0.

The inverse of lambda is generally used in engine fuel management to denote an enrichment value, $\gamma$. Thus, $\gamma = 1/\lambda$, where $\gamma$ is called the "equivalence ratio". When $\gamma$ is 1 then $\gamma = \lambda = 1$, which represents the stoichiometric ratio. When $\gamma$ is less than 1, the mixture is lean or has excess air in it. When $\gamma$ is greater than 1, the mixture is rich and the mixture has less air in it.

In regard to present-day fuel efficiency demands, the stoichiometric of 14.7:1 mixture is relatively rich and fuel economy suffers. When the mixture is made leaner, the lean mixture has excess air in it and becomes harder to ignite and to burn completely using normal ignition systems.

The ideal mixture from a fuel economy point of view is a very lean 24:1 air-fuel ratio ($\gamma = 0.55$) or leaner. The excess air in this mixture is about 32% more than the stoichiometric mixture. At this lean setting, the mixture won't burn sufficiently to produce power using even high performance electrical ignition techniques and as a result, large amounts of fuel are exhausted out of the engine.

For engines operating with lean mixtures, an object of pre-chamber fuel-air mixture control is to sufficiently enrich the pre-chamber mixture during the intake stroke of engine cylinder 18 so that the mixture within pre-chamber 30 at the time the pre-chamber spark plug 32 is fired will be a highly combustible mixture (near stoichiometry). Achieving this goal assures a good burn within the pre-chamber 30 and guarantees torching out of the flame front from the pre-chamber 30 to ignite a lean air-fuel mixture in the main combustion chamber 18. Thus, somewhat paradoxically, enriching the mixture within the smaller volume of pre-chamber 30 increases fuel economy because it permits a lean mixture within the larger main chamber 20 to be efficiently ignited.

Fuel injection is the means used to control the air-fuel mixture in the FIG. 1 and 3 embodiments of the present invention. The basic concept of electronic fuel injection (EFI) involves use of a timed pulse to cut fuel injectors on for a period of time to inject a quantity of fuel into the engine at a rate of one or more times per engine event.

There are several philosophies used in EFI today, such as the mass air flow (MAF) system, the speed density system, the throttle position control system and the vane air rate system. These systems differ primarily in how air flow is sensed and computed to ultimately obtain a mass air flow value.

In the present invention, the so-called "speed density system" is utilized to determine mass air flow, although the invention is not limited to this method. The speed-density system measures the manifold pressure (vacuum) and the temperature of the air in the manifold to obtain a computed value of mass air flow.

The manifold pressure (vacuum) sensor is proportional to air flow in the engine. A temperature correction to the air flow, called a density correction, results in mass air flow. There is no restriction to the air flow and the pressure (vacuum) measured is the true value regardless of whether the air entered through the throttle body, through leaks or from outside uses of the vacuum in the manifold.

The equation solved for fuel injection relates to computing a timed pulse time called pulse width (PW), which is the time the injectors are opened each time they are pulsed to allow a certain quantity of fuel to enter the engine. The injectors are pulsed once, twice or even three times per crank rotation depending on how the injection system is configured.

Since a constant fuel pressure is maintained at the injectors, the time the injector is "on" is proportional to the fuel quantity delivered to the engine by the injectors. The computed mass air flow is utilized by ECU 54 to help determine the appropriate quantity of fuel per injector pulse, which depends on another group of factors---the enrichments the engine needs for good performance.

There are many enrichments required for high performance and good drivability while also maintaining correct air-fuel ratios near stoichiometry for emission purposes. Typically, an EGO (exhaust gas oxygen) sensor is used in a feedback loop to keep the incoming air-fuel mixture at stoichiomatry. The EGO system is not utilized, however, in the present invention because the mixture being introduced to the pre-chamber is not at stoichiomatry until after mixing with the mixture in the main chamber.

The Various Enrichments ($\gamma_{mc}$)

1. Choke Enrichments a. Cold Start (SE). During cold start a large enrichment is required to prevent the mixture from going lean due to poor atomization (fuel not mixing) and falling out of the air when the engine is cold. SE is a function of temperature.

b. After Start (ASE). After start at low temperature, it is necessary to enrich the mixture for a short time due to the fuel condensing on the surface of the manifold. ASE is also a function of temperature.

c. Warm Up (WE). The warm up follows cold start. It is necessary to enrich the mixture until the engine heats up again due to fuel falling out before evaporation from heat can take place. WE is also a function of temperature.

2. Acceleration Enrichments (AE) and (DCLE).

a. When the throttle is opened momentarily, the mixture is temporarily "leaned-out". A burst of enrichment (AE) is needed to cancel the lean-out condition to ensure good transit response.

Acceleration enrichment prevents the familiar "flat spot" in throttle response and provisions are made to enrich for this. The amount of acceleration enrichment at a cold engine temperature is greater than for hot engines and is also a function of temperature.

b. Similarly, during deceleration the fuel is reduced or cut-off with an associated de-acceleration enrichment (DCLE), which is also a function of temperature.

3. Volumetric Efficiency (VE Table).

The engine is not a perfect air pump, pumping more efficiently in the mid-range while becoming less efficient at low and high engine RPM, depending on the cam overlap and a myriad of other design parameters.

The V-$E_{mc}$ table stored in the memory of ECU 54 allows compensation for these characteristics, where many enrichment (V$E_{mc}$) values are provided as a function of several engine operating values of RPM (along one axis) and MAP (along the other axis). Enrichment as either a + or − value can be entered into the table. A straight line approximation is then made by ECU 54 between the points along both the RPM and MAP axes. The position between points can be set evenly or unevenly as required on each axis. In the preferred embodiments, 64 enrichment values are empirically determined and entered into the V-$E_{mc}$ look-up table.

4. Density Enrichment (DE)

As previously stated, the temperature of the air in the manifold changes the charge density of the engine. Manifold air temperature (MAT) sensor 64 measures this and provides the system with a signal proportional to air temperature. An enrichment DE is computed to compensate for this effect.

Total Enrichments ($\gamma_{mc}$)

All of the enrichment values are summed (added) together to obtain the total enrichment ($\gamma_{mc}$). As described herein, some of the enrichments are time varying, some vary with engine coolant temperature, while others vary during acceleration or deceleration.

Total enrichment is the sum of all enrichment and is expressed as:

$$\gamma_{mc} = ASE + SE + WE + AE - DCLE + VE_{mc} + DE$$

When $\gamma$ is greater than 1, a rich air-fuel mixture is involved, and when $\gamma$ is less than 1, a lean mixture is involved.

The computation of $\gamma$ for the main chamber ($\gamma_{mc}$) continuously sums all the above enrichments. The basic equation that is solved for the pulse width (PW$_{mc}$) is:

$$PW_{mc} = MAP\left(\frac{K}{1+RT}\right) \times \gamma_{mc} \times FIC + ITO + BTO$$

where MAP is manifold absolute pressure, k/(1+RT) is a density correction factor, and FIC, ITO and BTO are constants, as described below.

The term K/(1+RT) is a density correction that corrects MAP to obtain mass air flow (T is absolute temperature in the intake manifold and R is the universal gas law constant). $\gamma_{mc} = 1$ whenever no additional enrichment is involved.

FIC is an arbitrary value called the fuel injection constant, and is used to allow the system to be scaled for different size fuel injectors and different engines. FIC can have values from 20 to 100% in order to compensate for different injector flow rates, different induction flow rates, and to compensate for different injection pulses per revolution to allow the fuel delivery rate to be adjusted for incoming air flow restriction.

ITO provides compensation for the turn-on time of the injectors and BTO represents change in turn-on time due to fluxuation in the battery voltage.

The dynamic range of injection is limited, and, in engines that have a large speed change, it is necessary to vary the maximum pulse width. To configure the system to any engine, it is necessary to have one additional scaling term, TOM. This term sets the maximum time for the pulse width (PW) of the injector pulse. This scaling term is needed because high-speed engines have a shorter time available to inject than low-speed engines—and unless the system is correctly configured, the digital resolution will be adversely affected with the computer. The final equation is thus:

$$PW_{mc} = \left[MAP \frac{K}{(1+RT)} \times \gamma_{mc} \times FIC\right] TOM + ITO + BTO$$

where TOM is programmable with a value of from 5 to 20 ms.

Figure 4:
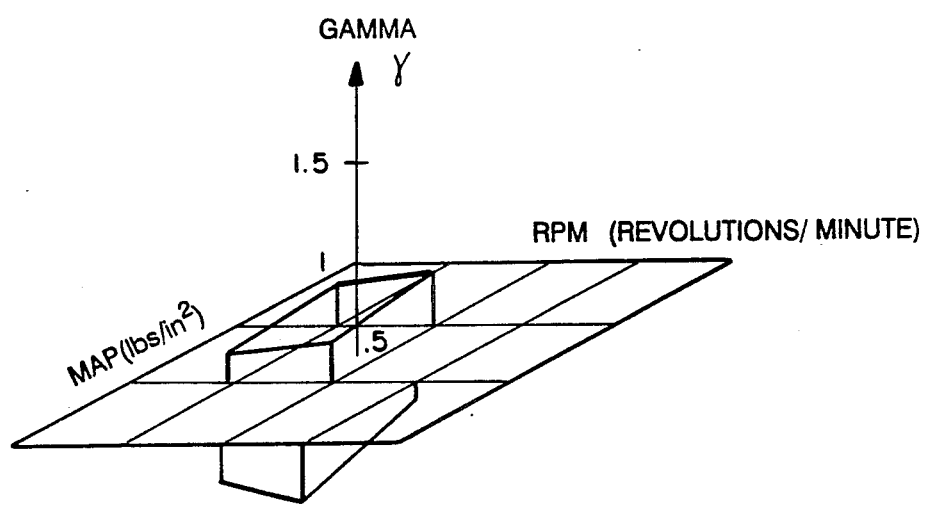
FIG. 4 is a three-dimensional graphical plot of a typical look-up table plotting $\gamma$ (the enhancement value) over the MAP and RPM range for the exemplary embodiment shown in FIG. 1.

To accomplish the fueling of the pre-chamber, ECU 54, in the preferred embodiment, uses $\gamma_{mc}$, the equivalence ratio, as computed for the fueling of the main combustion chamber engine fuel control. A three-dimensional pre-chamber mixture look-up table V-$E_{pc}$, similar to the V-$E_{mc}$ table for the main chamber 18, is also stored in the memory of ECU 54 and utilized by ECU 54 to calculate pre-chamber air-fuel ratios. A straight line interpolation between the set points on both the RPM axis and the MAP axis (see FIG. 4) provides accurate pre-chamber fuel enrichment values (V$E_{pc}$) over the entire operating range of the engine, while taking into account the compression ratio of the engine and other constants for the particular engine.

Since fuel acceleration enrichment and de-acceleration de-enrichment could occur at any time and over any part of the operating range of the engine, $\gamma_{mc}$ (the equivalence ratio of the main engine fueling system) must be multiplied by the value interpolated in the three dimensional enrichment table V-$E_{pc}$ to determine the pre-chamber pulse width, as shown below:

$$PW_{pc} = \gamma_{mc} \times [VE_{pc}]$$

In the V-$E_{pc}$ 3-D look-up table, V$E_{pc}$ is empirically determined for each operating point as an interpolated function of specific RPM and MAP values.

Figure 6:
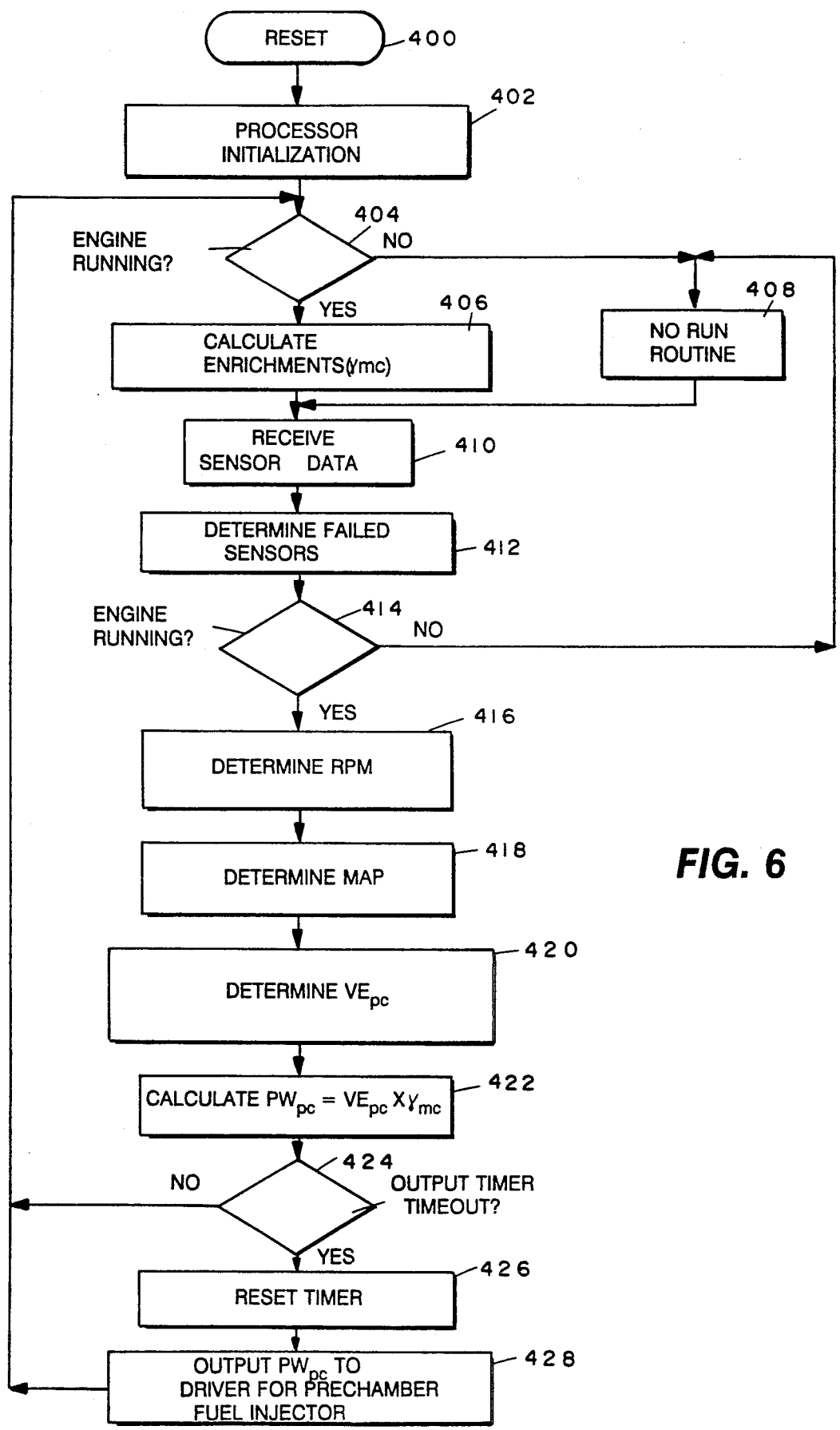
FIG. 6 is a flowchart of the exemplary program control performed by the FIG. 1 microprocessor to determine pre-chamber mixture control.

FIG. 6 illustrates exemplary program control steps performed by microprocessor-based ECU 54 to provide pre-chamber air-fuel mixture control. The flowchart shown is intended to represent the calculation of the pre-chamber pulse width and its output to the pre-chamber fuel injector.

The microprocessor in ECU 54 is reset at step 400 and initialized at step 402. At step 404 it is determined if the engine is running. If the engine is running the processor calculates the main chamber enrichments ($\gamma_{mc}$) at step 406. If the engine is not running, the processor branches to a NO RUN routine at step 408, thus skipping the enrichment calculation step 406.

The various sensors then send data for the next $\gamma_{mc}$ calculation to the microprocessor at step 410, and any failed sensors are detected at step 412. At step 414 the processor then makes another engine operation determination, branching back to the NO RUN routine at step 408 if the engine is not running. If the engine is running at step 414, engine RPM is determined at step 416 and MAP is determined at step 418.

$VE_{pc}$ is then interpolated at step 420 from the three-dimensional map $V-E_{pc}$, which has four RPM (engine speed) pages and five MAP pages located in a memory in ECU 54. Once the preliminary pulse width has been determined, it is multiplied by $\gamma_{mc}$ previously determined to arrive at the actual pulse width of the pre-chamber injector at step 422. The pre-chamber injector is turned on for this amount of time every x milliseconds, where x is a programmable value.

As previously described, the fuel is injected into pre-chamber 30 at set intervals, but $PW_{pc}$ computations occur at a faster rate. A timer in ECU 54 determines when the fuel should be injected into the pre-chamber. This output timer of the processor is checked at step 424. If there is no time-out, the microprocessor branches to step 404. If there is a time-out, the timer is reset at step 426 and $PW_{pc}$ is output to a driver for the pre-chamber fuel injector at step 428.

Note that when the engine is not running, no enrichments or pre-chamber pulse width is calculated. Rather, ECU 54 virtually loops through steps 408-414 waiting for the engine to start.

This engine management system is a modified version of the ELECTROMOTIVE, INC. TEC-E System. The TEC-E System is a commercially available engine management control system manufactured by ELECTROMOTIVE, INC. The entire TEC Calibration Software User's Manual, published and copyrighted by ELECTROMOTIVE, INC., is herein incorporated by reference. The engine management system in the exemplary embodiments utilizes a Motorola 68HC11 microcomputer and the HREIC Chip, and is a complete engine management system on a single PC board.

FIG. 3 is a block diagram of a further exemplary embodiment of the present invention, having engine 10 including a piston 12 reciprocally moving in cylinder 18 forming main combustion chamber 20. Intake tract 24 communicates with main combustion chamber 20 via intake valve 22. A pre-chamber structure 29 containing pre-chamber 30 is screwed into existing spark plug hole 32 in cylinder 18 allowing communication between pre-chamber 30 and main combustion chamber 20. In this embodiment one-way ball check valve 114 is located at an exit of pre-chamber 30 communicating with main combustion chamber 20. Ball check valve 114 allows an air-fuel mixture flow from pre-chamber 30 to main combustion chamber 20, and blocks an air-fuel mixture flow from main combustion chamber 20 to pre-chamber 30. Spark plug 33 communicates with pre-chamber 30 via pre-chamber spark plug hole 34 for igniting any fuel-air mixture within pre-chamber 30 at an appropriate time for ignition (just as in the FIG. 1 embodiment). Since pre-chamber 30 has an additional ball check valve 114 located between engine main combustion chamber 20 and the pre-chamber 30, fluid contact between the pre-chamber 30 and the main chamber 20 occurs only when the main chamber 20 is on the intake or the power stroke. Therefore, the mixture in the main chamber 20 cannot enter the pre-chamber 30 on the compression or the exhaust stroke. Engine management otherwise occurs as in the preferred exemplary embodiment shown in FIG. 1.

In this FIG. 3 exemplary embodiment, the air-fuel mixture supplied to the pre-chamber is always a highly combustible mixture with a 14.7:1 air-fuel ratio, since blending of the main chamber mixture (which can be made lean or rich) with the pre-chamber mixture cannot take place.

In operation, an air-fuel mixture is drawn from orifice 92 into common fuel distribution chamber 40. Fuel enters distribution chamber 40 from fuel supply 128 via metering valve 130. The air-fuel mixture entering distribution chamber 40 is determined by the fuel metering adjustment of valve 130. The air-fuel mixture then enters pre-chamber 30 during the engine intake stroke through feed line 36 and feed line ball check valve 38. The check valve 114 between the main chamber 20 and the pre-chamber 30 is opened by the low pressure (vacuum) of the main chamber 20 caused by the downward movement of the piston 12, as shown in FIG. 2. At lower engine speeds some of the air-fuel mixture passes through the pre-chamber 30 and enters the main chamber 20. This results in a dual fuel supply to the main combustion chamber which must be taken into account by ECU 54 during engine management. This compensation can be done by empirically altering the enrichment of the main fuel control system, i.e., by changing the $VE_{mc}$ values in the $V-E_{mc}$ table at the operating points where this occurs.

The fueling means of the pre-chamber 30 in the FIG. 3 embodiment can be either a carburetor type or fuel injection type and is relatively simple since a constant air-fuel mixture is always introduced into the pre-chamber 30.

The pre-chamber fuel induction system of the present invention is also adaptable to operate on gaseous fuels, such as LPG, natural gas or hydrogen.

Figure 5:
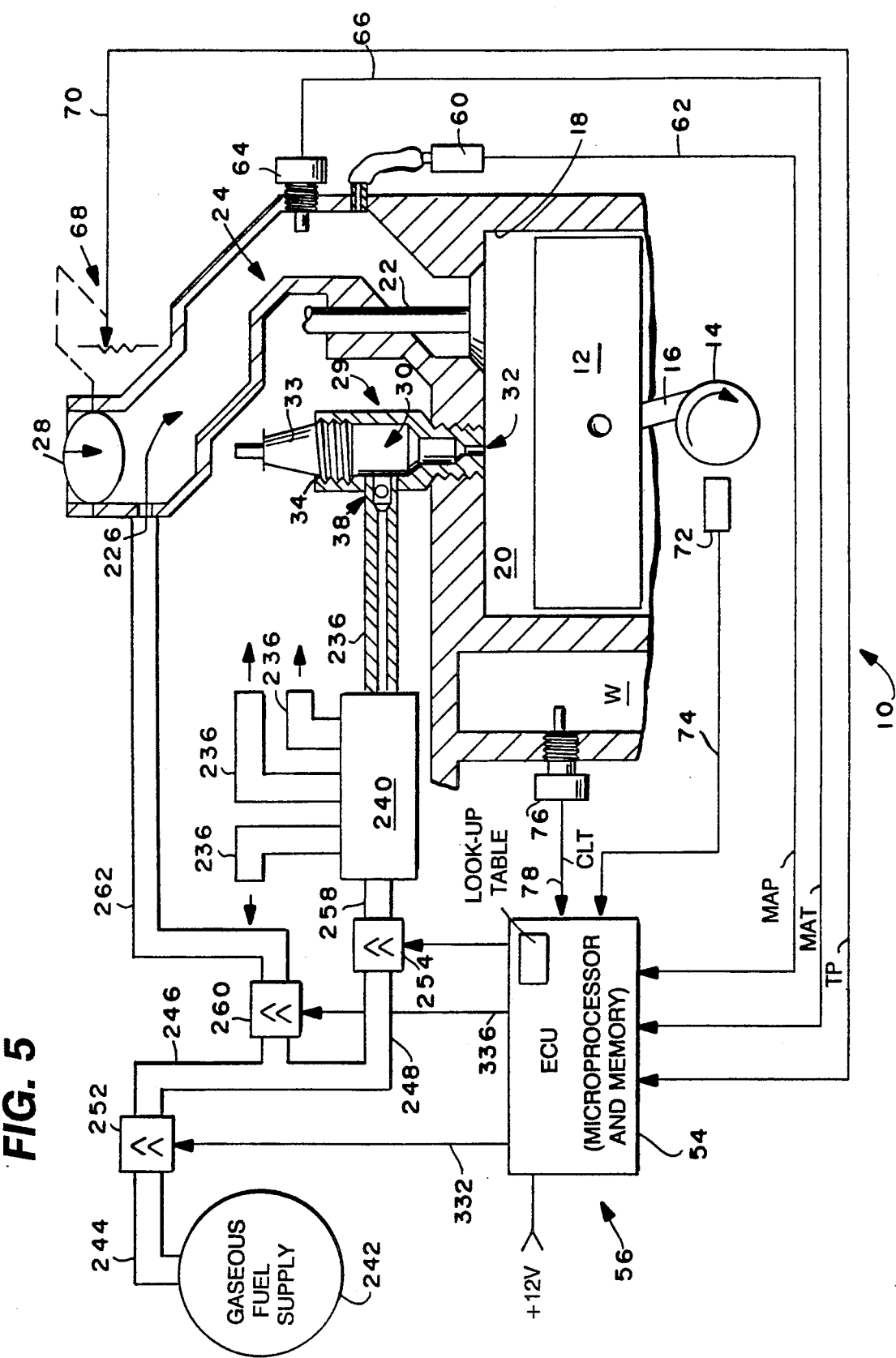
FIG. 5 is a schematic diagram of an exemplary gaseous fuel engine management control system using pre-chambers to ignite the main chamber air-fuel mixture according to the present invention.

Referring to FIG. 5 (a schematic diagram of an engine fueling system designed to operate with gaseous fuel instead of gasoline), engine 10 includes a piston 12 connected to crankshaft 14 via connecting rod 16. Piston 12 reciprocates in cylinder 18 which forms main combustion chamber 20. Intake valve 22 controls the communication of combustion chamber 20 with intake tract 24 into which a main air-gaseous fuel mixture is injected via orifice 226. Upstream of orifice 226 in intake tract 24 is butterfly valve 28 which controls the amount of air permitted into intake tract 24 and further into combustion chamber 20. A pre-combustion chamber structure 29 containing pre-chamber 30 is screwed into the original spark plug hole 32 allowing communication with main combustion chamber 20. In turn, a spark plug 33 communicates with pre-chamber 30 via spark plug hole 34.

As in the FIG. 1 embodiment, pre-chamber 30 communicates in direct fluid contact with main combustion chamber 20 through original spark plug hole 32. A gaseous fuel feed line 236 communicates with pre-combustion chamber 30 via a one-way ball check valve 38 which permits fluid flow into pre-chamber 30 from feed line 236, but does not permit fluid flow out of pre-chamber 30 into feed line 236.

In the FIG. 5 embodiment, the gaseous mixture introduced into pre-chamber 30 is preferably 100% gaseous fuel, although air could be added with slight apparatus modification. A separate air-gaseous fuel mixture also flows into main combustion chamber 20 from intake tract 24 via intake valve 22 during an intake stroke of internal combustion engine 10, during which time there is a vacuum in both combustion chambers, as shown in FIG. 2. Check valve 38 prevents the expulsion of gas out of pre-chamber 30 when the pressure is high during the compression, power and exhaust strokes of the engine as shown in FIG. 2. In multiple-cylinder engines only one intake valve is open at any one time and a gaseous-fuel mixture via multiple feed lines 236 can be introduced into each pre-chamber 30 without additional valve means from a common gaseous fuel distribution chamber 240. Gaseous fuel distribution manifold 240 is fed via feed lines 244, 246, 248 and 258 and solenoid valves 252 and 254. Solenoid valve 252 controls the flow of gas to both solenoid valves 254, 260, while solenoid valve 254 controls the flow of gas to distribution chamber 240 via feed line 258. Solenoid valve 260 further controls the flow of gas to orifice 226 via feed line 262.

The control of the supply of gaseous fuel to both main chamber 20 and pre-chamber 30 is provided by an engine management control system 56 which includes a microprocessor-based ECU 54. In the FIG. 5 gaseous fuel embodiment, the "sensed" engine operating parameters (manifold absolute pressure, manifold absolute temperature, throttle position, crankshaft position and coolant temperature) are input to ECU 54 as in the FIG. 1 and 3 embodiments. ECU 54 then electronically controls gaseous fuel supplied by computing a pulse width that controls the time a solenoid valve is open. ECU 54 controls solenoid valve 252 via line 332, solenoid valve 254 via line 334, and solenoid valve 260 via line 336. The valves are pulsed at a set frequency, preferably 30 Hz in the FIG. 5 exemplary embodiment.

The "time open" of the solenoid valves 252, 254, 260 controls the quantity of gaseous fuel delivered to pre-chamber 30 and main combustion chamber 20 of engine 10, not unlike how the "time on" the fuel injectors of the FIG. 1 and 3 embodiments controls the quantity of fuel supplied to the combustion chambers. However, instead of controlling signals to the fuel injectors of the engine fuel control system at a rate dependent on engine speed as in the FIG. 1 exemplary embodiment, the signals to the solenoids occur at a set frequency (30 Hz) for both the main engine fuel control solenoid 260 and the pre-chamber fuel control solenoid 254.

As a result, engine 10 is fueled with dual sources: the supply of gaseous fuel from solenoid valve 260 via orifice 226 in a normal way to combustion chamber 20; and the gaseous fuel supplied to the pre-chamber 30 through its dedicated solenoid valve 254, as described above. It is necessary to keep account of total fuel delivered as well as the air-gaseous fuel mixture delivered to main chamber 20 while providing control—so that whatever mixture is delivered to the main chamber 20, the mixture delivered to pre-chamber 30 remains essentially 100% gaseous fuel. The flow into pre-chamber 30 is relatively low and the rate of fuel flow can be controlled by solenoid valves 252, 254. Otherwise the system works like the previous gasoline-fueled engine using a pre-chamber.

It is apparent that the pre-chamber 30 described in each of the exemplary embodiments could be built into the cylinder head instead of screwed into the head as taught herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An internal combustion engine including at least one combustion chamber and a pre-chamber in fluid communication with said combustion chamber, a method of providing combustion within said combustion chamber comprising the following steps:
   (a) charging said combustion chamber with a first mixture of air and fuel having a lean ratio of air-to-fuel;
   (b) charging said pre-chamber with a further mixture of air and fuel, said further mixture having a ratio of air-to-fuel that is compensated by an amount responsive to the leanness of the mixture used to charge said combustion chamber, the volume of the prechamber, the volume of the main chamber, and the compression ratio of the engine;
   (c) mixing, within said pre-chamber, a portion of said combustion chamber mixture with said pre-chamber mixture to provide a still further mixture having an air-to-fuel ratio that is optimally ignitable while the mixture within said combustion chamber continues to have substantially said lean ratio of air-to-fuel;
   (d) igniting the still further mixture within said pre-chamber to create a flame front; and
   (e) propagating said flame front into the combustion chamber to ignite the air and fuel mixture within said combustion chamber,
   wherein said step (b) is performed over at least a large portion of the operation range of the engine.

2. The method of claim 1, wherein said charging step (a) is practiced with said desired ratio of air-to-fuel being substantially leaner than stoichiometry.

* * * * *